United States Patent
Herzog

(10) Patent No.: US 9,560,312 B2
(45) Date of Patent: Jan. 31, 2017

(54) TIME SYNCHRONIZATION OF VIDEO AND DATA INSIDE A MOBILE DEVICE

(71) Applicant: Cellco Partnership, Basking Ridge, NJ (US)

(72) Inventor: Richard W. Herzog, Long Valley, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 159 days.

(21) Appl. No.: 14/102,751

(22) Filed: Dec. 11, 2013

(65) Prior Publication Data

US 2015/0163379 A1 Jun. 11, 2015

(51) Int. Cl.
- *H04N 7/025* (2006.01)
- *H04N 21/8547* (2011.01)
- *H04N 21/43* (2011.01)
- *H04N 21/21* (2011.01)
- *H04N 21/80* (2011.01)
- *H04N 21/236* (2011.01)
- *H04N 21/40* (2011.01)
- *H04N 21/81* (2011.01)
- *H04N 21/23* (2011.01)
- *H04N 21/234* (2011.01)
- *H04N 21/20* (2011.01)
- *H04N 21/414* (2011.01)

(52) U.S. Cl.
CPC .............. *H04N 7/025* (2013.01); *H04N 21/20* (2013.01); *H04N 21/21* (2013.01); *H04N 21/23* (2013.01); *H04N 21/236* (2013.01); *H04N 21/23424* (2013.01); *H04N 21/23608* (2013.01); *H04N 21/40* (2013.01); *H04N 21/41407* (2013.01); *H04N 21/43* (2013.01); *H04N 21/4302* (2013.01); *H04N 21/4307* (2013.01); *H04N 21/80* (2013.01); *H04N 21/81* (2013.01); *H04N 21/8126* (2013.01); *H04N 21/8547* (2013.01)

(58) Field of Classification Search
CPC ................................................ H04N 21/23608
See application file for complete search history.

(56) References Cited

U.S. PATENT DOCUMENTS

| | | | | |
|---|---|---|---|---|
| 4,698,664 | A * | 10/1987 | Nichols et al. | 348/184 |
| 2005/0223034 | A1 * | 10/2005 | Kaneko et al. | 707/104.1 |
| 2006/0075442 | A1 * | 4/2006 | Meadow | 725/91 |
| 2009/0213270 | A1 * | 8/2009 | Ismert et al. | 348/575 |
| 2011/0319160 | A1 * | 12/2011 | Arn et al. | 463/30 |
| 2011/0321114 | A1 * | 12/2011 | Newell | H04N 21/234318 725/146 |
| 2013/0095806 | A1 * | 4/2013 | Salkintzis | H04L 65/601 455/414.3 |
| 2013/0268630 | A1 * | 10/2013 | Besehanic et al. | 709/219 |

* cited by examiner

*Primary Examiner* — Justin Shepard

(57) ABSTRACT

A video player tablet, or a mobile device includes a processor configured to receive live video and audio data from a communication network and format the video and audio data for display on the tablet. The processor is also configured to receive live meta-data from the communication network and format the meta-data for display on the same tablet. The processor is further configured to select the meta-data, and time synchronize the selected meta-data with the video and audio data for simultaneous display on the tablet, or mobile device.

20 Claims, 7 Drawing Sheets

TIME SYNCHRONIZATION OF VIDEO AND DATA INSIDE A MOBILE DEVICE

BACKGROUND

In recent years, mobile communication services have expanded and increased in popularity around the world. Many advanced networks offer wireless mobile communication service for voice calls, mobile phone messaging services (e.g., text and/or multimedia) and data communications. The data services, for example, enable surfing the world wide web, e.g., via a browser. The speeds of the data communications services have steadily increased as service providers have migrated the networks to newer generation technologies with broadband data communication capabilities, and the mobile stations have steadily advanced to take advantage of the new network technologies. The data communication capabilities of the mobile stations and the broadband data communication services offered by the networks enable users to perform more and more tasks and to access a rapidly expanding variety of content, all from their mobile stations. Examples of mobile station content items include, without limitation, media, games, messaging, social networks, stores, and any other applications or information for use on a mobile phone or on a tablet computer.

Referring to tablet computers, or simply tablets, these devices differentiate themselves from mobile phones in that they are larger than mobile phones and are used mainly for viewing published content from the Internet, such as video and news. Mobile developers today are increasingly creating applications for use on tablets. These applications are usually supplied through online distribution, rather than traditional methods of boxed software or direct sales from software vendors. These suppliers, knows as "app stores", provide centralized catalogues of software from the operating system (OS) supplier or device manufacturer, and allow easy installation and updates via network communication. The app store is often shared with smartphones that use the same operating system.

It may be desirable to provide a mobile device, such as a tablet, with a capability of receiving multiple sources of live information that are related to each other, but are published and processed at different rates. For example, it may be desirable for a user to view video that is streamed live from the Internet to a client player using HTTP Live Streaming (also known as HLS) communications protocol. Furthermore, it may be desirable for the same user to simultaneously view other information, such as meta-data, that provides additional information related to the HLS video. Assembling meta-data and HLS video (for example), in which each is published and processed at a different rate and perhaps from different sources, for simultaneous display, in real-time has not as yet been implemented.

Hence, a need exists for improved technologies for synchronizing information (for example, HLS video and meta-data) that is published and processed at different rates, so that a viewer may comprehend the multiple information displayed on a mobile device, or a tablet.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to acquisition of multiple paths of steaming content to a mobile device, such as a smartphone or a tablet. The acquisition of the multiple paths of streaming content includes assembling and displaying the different streaming content in a synchronous manner. For example, video, audio and meta-data may be transmitted from a sports venue via different communication paths and at different rates. The video and audio may originate from a content provider or origin server that provides service to another server. The meta-data, however, may be provided to the other server by a server that is different from the content provider/origin server. The origin and meta-data servers may be located more than a mile from each other, although they both may be streaming content that is related to the same venue.

Using an example of a sports venue, the video and audio may be transmitted via a satellite network, while the metadata may be transmitted via Internet Protocol (IP) packet data communications using terrestrial data communication transport media. A solutions integrator, which may act as an origin server, may receive the digital streams from a content provider. The solutions integrator may then ingest, process and encode HD (high definition) video and audio signals to MPEG-HLS or MPEG-DASH streaming protocols. Metadata may also be ingested utilizing a server and packetized to .Extensible Markup Language (.XML) or .Java Script Object Notation (.JSON) type identifier frames. These signals traditionally do not transmit as a single cohesive stream, where timing or time stamping are wrapped into a control header of the transport stream packet ID (PID).

As will be described, as an example, the video and audio data and the meta-data are both time stamped with consistent (e.g., GPS) timing protocols. In this manner, each respective data is time-tagged to the same timing signature, even though each respective data transmits from different physical locations. As a result, the video and audio data are time synchronized to the meta-data, so that all the data may be displayed in a mobile device (a smartphone or a tablet) in correct time sync.

Figure 1:
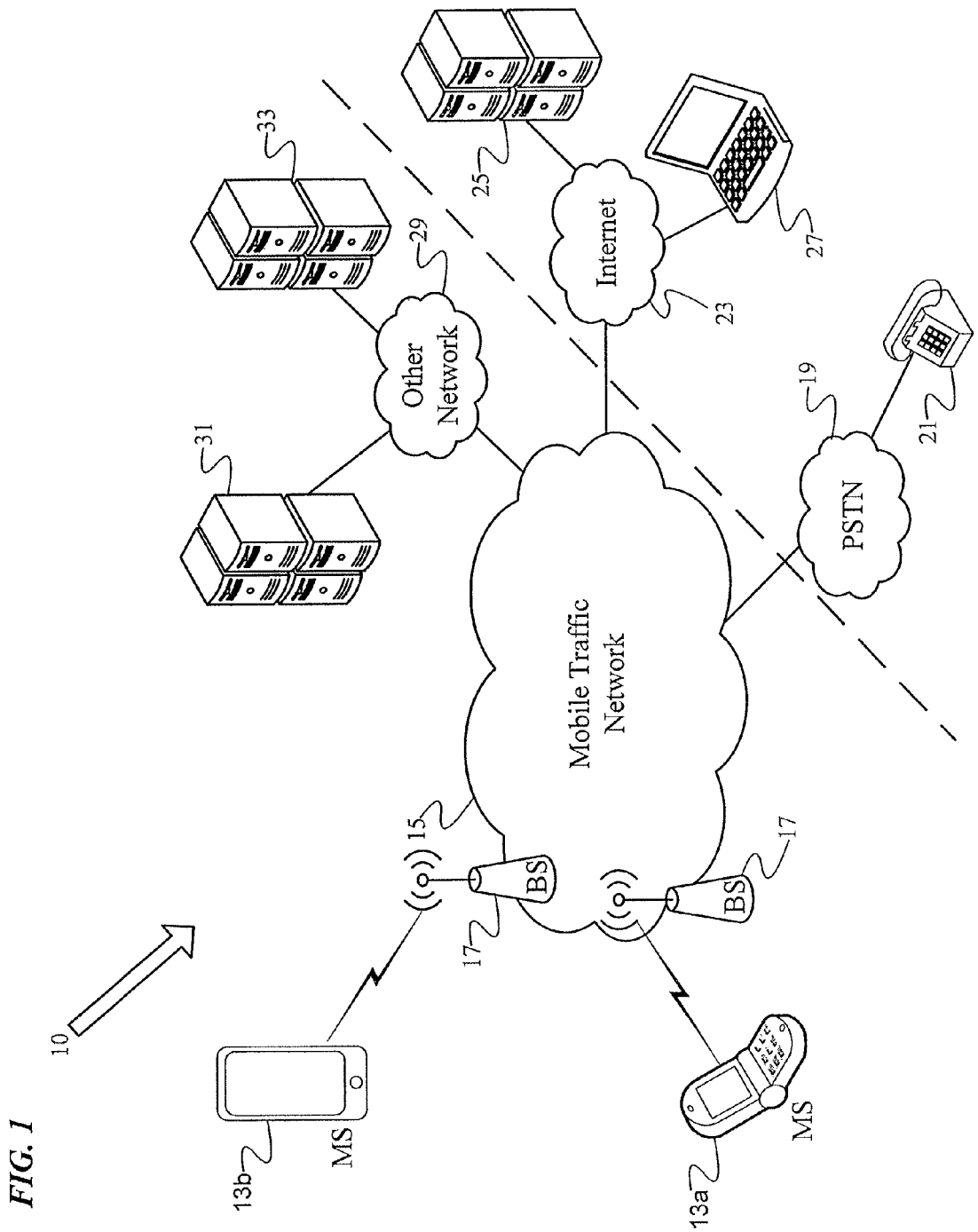
FIG. 1 is a high-level functional block diagram of an example of a system of a network/devices that provides various communications for mobile devices and supports an example of a system for synchronizing different types of data received by a mobile device (or mobile station).

Reference is now made in detail to the examples illustrated in the accompanying drawings and discussed below. FIG. 1 illustrates a system 10 offering a variety of mobile communication services, including synchronization methods for mobile device users, or mobile station users. The example shows simply two mobile stations (MSs) 13a and 13b as well as a mobile communication network 15. The stations 13a and 13b are examples of mobile stations that may be used for the synchronization method. However, the communication network provides similar communications for many other similar users, as well as for mobile devices/users that do not participate in the synchronization method. The network 15 provides mobile wireless communication services to those stations as well as to other mobile stations (not shown), for example, via a number of base stations (BSs) 17. The present techniques may be implemented in any of a variety of available mobile networks 15 and/or on any type of mobile station compatible with such a network 15. The drawing shows only a very simplified example of a few relevant elements of network 15 for purposes of discussion here.

The wireless mobile communication network 15 might be implemented as a network conforming to the long term evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13a and 13b are capable of communications through network 15, using the synchronization method, typically, or a variety of other methods/services. The exemplary devices 13a and 13b are capable of data communications through the network 15 and the users thereof typically have subscribed to data service through the networks.

The network 15 allows users of the mobile stations, such as 13a and 13b (and other mobile stations not shown), to initiate and receive telephone calls to each other as well as through the public switched telephone network (PSTN) 19 and telephone stations 21 connected to the PSTN. The network 15 typically offers a variety of data services via a global network (e.g., the Internet 23), such as downloads, web browsing, email, etc. The mobile stations 13a and 13b may receive and execute applications written in various programming languages, as described later.

Mobile stations, like 13a and 13b, may take the form of portable handsets, smart-phones, personal digital assistants, or tablets although they may be implemented in other form factors. Program applications, including an application to assist in the synchronization method, may be configured to execute on many different types of mobile stations. For example, a mobile station application may be written to execute on a binary runtime environment for mobile (BREW-based) mobile station, a Windows Mobile based mobile station, Android, iOS iPhone or iPad, Java Mobile, or RIM based mobile station such as a BlackBerry, or the like. Some of these types of devices may employ a multi-tasking operating system.

The mobile communication network 15 may be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of network 15, such as that serving mobile stations 13, may include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 may include a base transceiver system (BTS), which may communicate via an antennae system at the site of the base station and over the airlink with one or more of the mobile stations 13a and 13b, when the mobile stations are within range. Each base station may include a BTS coupled to several antennae mounted on a radio tower within a coverage area often referred to as a "cell." The BTS is the part of the radio network that sends and receives RF signals to/from the mobile stations that are served by the base station 17, including in the example mobile stations 13a and 13b. Later generation mobile networks utilize wireless access elements, each referred to as an eNodeB, to provide functions similar to those of a base station; but for convenience, the discussion here will generally include eNodeBs and other network wireless access devices under the general term base station.

The radio access networks may also include a traffic network represented generally by the cloud at 15, which carries the user communications and data for the mobile stations between the base stations 17 and other elements with, or through which the mobile stations communicate. It will be understood that the various network elements may communicate with each other and other networks (e.g., a PSTN 19 and the Internet 23) either directly or indirectly.

Although not shown, the provider or carrier may also operate a number of systems that provide ancillary functions in support of the communications services and/or application services provided through network 15, and those elements may communicate with other nodes or elements in system 10 via one or more private IP type packet data networks (sometimes referred to as an Intranet), i.e., a private network. Examples of such systems may include one or more application servers and related authentication servers.

A mobile station may communicate over the air with base station 17 and through traffic network 15 for various video and audio, and meta-data communications. If the mobile service carrier offers the synchronization service, the service may be hosted on a synchronization server 31, for communication via network 15. Alternatively, programming for the synchronization service may be distributed across multiple components of system 10. For a given service, including the synchronization service, an application program within a mobile station 13a or 13b may be considered as a 'client' and programming at server 31 may be considered as the 'server' application for the particular service. Two additional servers are shown, namely, server 33 communicating through network 29, and server 25 communicating through the Internet 23. As part of the synchronization service, server 25 may provide one type of data, for example, audio and video data of a live event; a second type of data for example, meta-data of the same event, may be provided by server 31. Both types of data may flow to a mobile device 13b through one or more networks, for example, network 29, Internet 23 and/or mobile traffic network 15. The manner in which both of these types of data are synchronized for viewing by a user of mobile device 13b is described later.

Associated synchronization events under consideration here may be delivered to touch screen type mobile stations, as well as to non-touch type mobile stations. Hence, mobile station (MS) 13a is shown as a non-touch type mobile station and mobile station (MS) 13b is shown as a touch screen type mobile station. Implementation of the synchronization service may involve some execution of programming in the mobile stations, as well as implementation of user input/output functions and data communications through network 15 from the mobile stations.

It may be useful to consider the functional elements/aspects of two exemplary mobile stations 13a and 13b, at a high-level.

Figure 2:
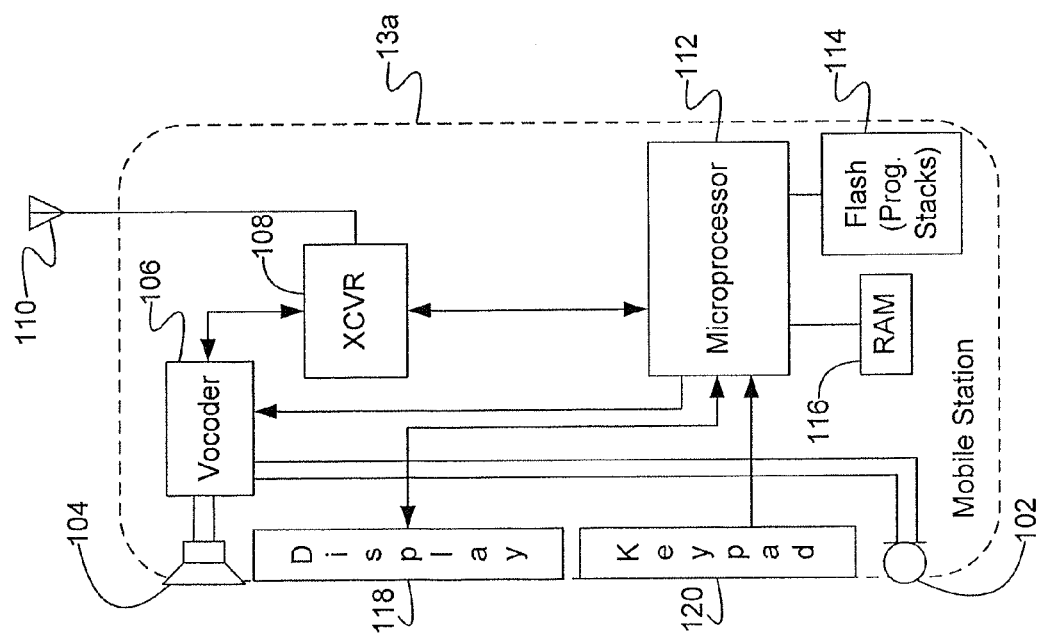
FIG. 2 is a high-level functional block diagram of an exemplary non-touch type mobile device, as may utilize a system for synchronizing different types of data received by a mobile device, similar to the system shown in FIG. 1.

For purposes of such a discussion, FIG. 2 is a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of network 15. The transceiver 108 also sends and receives a variety of signaling messages in support of the various audio and data services provided via the mobile station 13a and the communication network. Each transceiver 108 connects through radio frequency (RF) transmit and receive amplifiers (not separately shown) to an antenna 110.

The example mobile station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections. For example, the user may view a live event on display 118 of mobile device 13a. The user may select, by way of keypad 120, specific audio and video data for listening and viewing by way of speaker 104 and display 118, respectively. In addition, the user may select specific meta-data associated with the audio and video data. The manner in which the audio and video data together with the meta-data are synchronized will be described later.

A microprocessor 112 serves as a programmable controller for the mobile station 13a, in that it controls all operations of the mobile station 13a in accord with programming that it executes, for all normal operations, and for operations involved in the synchronization procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by microprocessor 112.

As outlined above, the mobile station 13a includes a processor, and programming stored in the flash memory 114 configures the processor so that the mobile station is capable of performing various desired functions, including the functions involved in the synchronization technique. Such functions may include time-stamping audio and video data of a live event; time-stamping meta-data that is associated with the same event; and several handshake communications between the mobile station and different servers across the network. These functions are described later.

Figure 3:
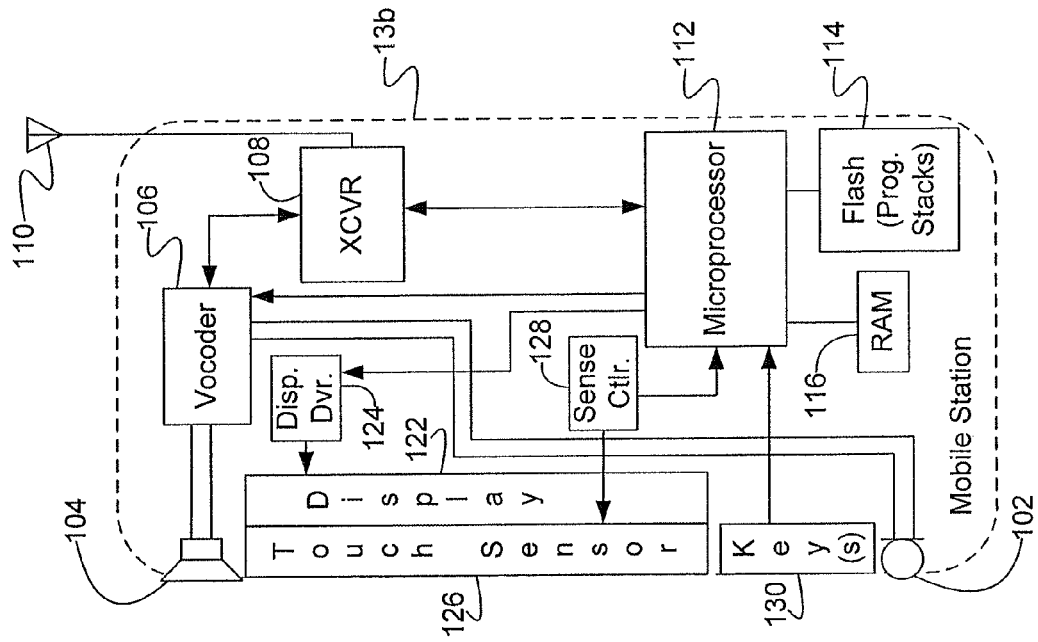
FIG. 3 is a high-level functional block diagram of an exemplary touch screen type mobile device, as may utilize a system for synchronizing different types of data received by a mobile device, similar to the system shown in FIG. 1.

FIG. 3 is a block diagram illustration of an exemplary touch screen type mobile station 13b. Although possibly configured somewhat differently, at least logically, a number of the elements of the exemplary touch screen type mobile station 13b are similar to the elements of mobile station 13a, and are identified by like reference numbers in FIG. 3. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of network 15. The transceiver 108 also sends and receives a variety of signaling messages in support of the various audio and data services provided via mobile station 13b and the communication network. Each transceiver 108 connects through RF transmit and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the synchronization procedure under consideration here. In the example, mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, as outlined above, the mobile station 13b includes a processor; and programming stored in the flash memory 114 configures the processor so that the mobile station is capable of performing various desired functions, including in this case the functions involved in the synchronization technique.

In the example of FIG. 2, the user interface elements include a display and a keypad. The mobile station 13b (of FIG. 3) may have a limited number of keys 130, but the user interface functions of the display and keypad are replaced by a touchscreen display arrangement. At a high level, a touchscreen display is a device that displays information to a user and detects occurrence and location of a touch on the area of the display. The touch may be an actual touch of the display device with a finger, stylus or other object, although at least some touchscreens may also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver (disp. dvr.) 124, to present visible outputs to the device user. The mobile station 13b also includes a touch/position sensor 126. The sensor 126 is relatively transparent, so that the user may view the information presented on the display 122. A sense circuit (sense ctlr.) 128 senses signals from elements of the touch/position sensor 126 and detects occurrence and position of each touch of the screen formed by display 122 and sensor 126. The sense circuit 128 provides touch position information to microprocessor 112, which may correlate that information to information currently displayed via display 122, to determine the nature of a user input via the screen.

The display 122 and touch sensor 126 (and possibly one or more keys 130, if included) are the physical elements providing the textual and graphical user interface for mobile station 13b. The microphone 102 and speaker 104 may be used as additional user interface elements, for audio input and output, including with respect to some synchronization functions for the user delivered via the mobile station. The synchronization aspects, highlighted previously with respect to mobile station 13a, apply similarly to mobile station 13b and will be described later in greater detail.

It will be understood that the structure and operation of the mobile stations 13a and 13b, as outlined above, are describe by way of example only.

Figure 4:
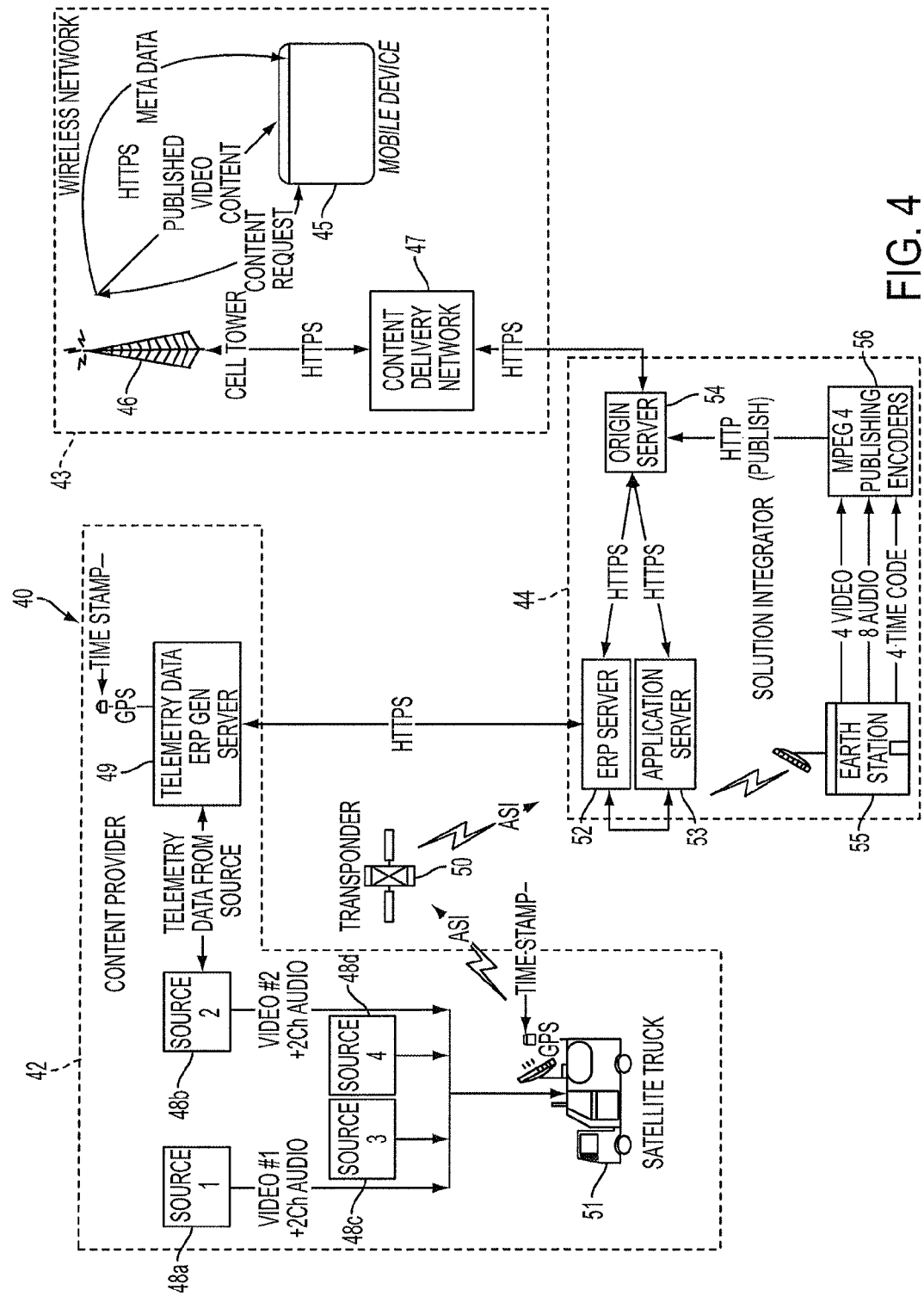
FIG. 4 is a high-level functional block diagram of an example of a system of a network that provides communications for mobile stations and supports an example of a system for delivering different types of data to an end user, in which the data is obtained from different sources viewing a live event, and synchronizing the data, so that the user can view the data in a comprehensive and orderly manner.

Referring now to FIG. 4, a synchronization method is incorporated in a system, generally designated as 40, providing various communications to a mobile device 45, in which the mobile device (or mobile station) is shown as part of a wireless network 43. The wireless network also includes a cell tower 46 and a content delivery network 47. It will be appreciated that mobile device 45 may be similar to any of the mobile stations discussed above and likely is a tablet that may be similar to mobile station 13b shown in FIG. 1. The tablet allows a user to view a display including live video (for example) and meta-data in the form of text (for example). In addition, cell tower 46 and content delivery network 47 may be similar to base station 17 and mobile traffic network 15, respectively, both shown in FIG. 1.

Other portions of system 40 include a content provider 42 and a solutions integrator 44. Each is described below.

The content provider 42, in the example shown in FIG. 4, is configured to provide video and audio data of an event occurring in real time and provide telemetry data (meta-data) including several parameters changing during the event. For example, the event may be an Indianapolis Car Race; the video and audio data may be multiple video/audio streams of race cars and drivers, as they are imaged at different locations on the race track; and the telemetry data (meta-data) may include varying parameters regarding the status of each car and driver in the race. Such parameters may include, for example, lap number, car speed and acceleration, tire pressure, etc. In a car race, there may be as many as 50 different parameters that are available for monitoring of each race car, in order to assess how well the driver is performing during any interval of the race.

Returning to content provider 42, the example shows four video/audio streams provided from four different imaging sources, namely sources 48a-48d. Any number of imaging sources may be available, for example, in which a different imaging source may be a camera positioned inside a race car (used as an example for explanation purpose). As shown, each source provides one video stream and two channels of audio associated with the respective video. The video streams are transmitted to a satellite truck 51 that is located adjacent the event (Indy Race, for example). The truck 51 is configured to receive the video and audio streams and transmit the same to a transponder disposed in a satellite 50. The transmission may be in the form of an asynchronous serial interface (ASI) format, which streams data carrying an MPEG transport stream (MPEG-TS). Generally the ASI signal is a final product of video compression techniques.

The truck 51 and satellite 50 are shown by way of example of one form of video and audio data communication technologies for communicating multiple video and audio streams, although other equipment may be used in place of the truck, and/or other non-satellite communication media may be used.

Furthermore, content provider 42 includes an Enhanced Result Protocol (ERP) generator server 49 which is configured to receive telemetry data (meta-data) from the multiple sources 48a-48d. By way of example, telemetry is widely used in motor car racing, allowing race engineers to interpret data collected during a race and use it to properly tune a race car for optimal performance. Examples of measurements on a race car may include accelerations in three axes, temperature readings, wheel speed and suspension displacement. Also included may be readings to determine driver performance and vehicle performance. These parameters, referred to herein as meta-data, may be picked up by various sensors distributed around the race car, and may even be located on the driver himself. Data from these multiple sensors may be transmitted by wireless mechanisms, such as radio, or infrared systems, optical links, or GSM (global systems for mobile) communication networks. Accordingly, sources 48a-48d may include audio/video data, meta-data, or both types of data. The ERP generator server extracts meta-data parameters that may be of interest to the end user, who is viewing the race and data using mobile device 45. The extracted meta-data is formatted by the ERP generator server 49 into a Hypertext Transfer Protocol Secure (HTTPS) communications protocol for secure communication over the network. The server 49 transmits the HTTPS formatted meta-data to a solution integrator 44. Such meta-data may include speed and acceleration of a particular race car.

In the example depicted in FIG. 4, system 40 includes solution integrator 44. The solution integrator 44 includes an ERP server 52, an Application server 53, and an origin server 54. Also included in the solutions integrator 44 is an Earth station 55 and one or more encoders, such as MPEG 4 Publishing Encoders 56 as shown. These elements are now described separately below.

The solutions integrator 44 publishes the video imagery, related audio and meta-data that are received from the content provider 42 onto the content delivery network 47 for presentation to users/consumers of the content via mobile devices such as device 45. The Earth station 55 receives the video and audio data as a downlink from the transponder in satellite 50; the video and audio data are then encoded by the MPEG 4 Publishing Encoders 56. The video and audio data are streamed to the origin server 54 in an HTTP communications format, which may or may not be in a secure HTTPS format, depending, for example, on the content being streamed.

The ERP server 52 receives the meta-data from ERP generator server 49 in HTTPS communication format. It will be appreciated that the ERP server is shown as an example particular to the system shown in FIG. 4. The ERP server 52 may be optional in another example of synchronization techniques, because the origin server 54 may communicate directly with the ERP generator server 49. In the example of FIG. 4, the ERP server acts as an intermediary between the ERP generator server and the origin server. A function of the ERP server may be to filter and eliminate contents of meta-data that are race-sensitive, in that the contents may provide advantages to other race cars participating in the race. An example is tire temperature or tire pressure information of a competitor in the race.

The origin server 54 as configured in the example of system 40 receives the meta-data that is sent from the content provider 42. The origin server 54 begins the process by streaming video content with timecode to the content delivery network on command from the mobile device. Simultaneously, the mobile device 45 then sends a request to the application server 53. The application server 53 receives this request with the time code call out, then sends back to the mobile device 45 the corresponding meta-data in the play list, with the exact timecode signature. The origin server 54 then transmits both the video/audio stream and the meta-data to the content delivery network 47. The timing between the two types of data is further described below with respect to FIG. 6. It will be appreciated that, as used herein, the origin server 54 is a server that transfers data to other servers that are physically located closer to end users requesting the data in a network communication system. For example, origin server 54 may be an Internet server provider (ISP) that transfers HTTPS formatted data to a local content delivery network 47, which in turn delivers data to cell tower 46. The mobile device 45 receives both the video/audio stream in an HTTPS Live Streaming (HLS)-based media streaming communications protocol and the meta-data in an HTTPS communications protocol. The Application server 53 satisfies time synchronization requirements between a client application residing in mobile device 45 and the solution integrator 44. These time synchronization requirements are described further below.

An external clock or GPS timing system is added to the ERP generator server 49 in the content provider 42, as shown in FIG. 4. The ERP generator server 49 is responsible for inserting the time data into the meta-data field. The time data may be in the form of a header, or the time data may be inserted within a packet. The external clock timing may be used in place of a Network Time Protocol (NTP), the latter configured as a networking protocol for clock synchronization between computer systems over packet-switched, variable-latency data networks. The meta-data is then transmitted in an HTTPS communications protocol to the solutions integrator 44. It will be appreciated that the meta-data may now include a packetized .XML or .JSON type identifier frames.

In addition, an external clock or GPS timing system is added to the video transmission point, or the satellite uplink truck 51, shown as an example for explanation purpose. The purpose of the GPS timing system is to time stamp each video/audio channel at the video transmission point. The time stamp may be in a format defined by the Society of Motion Picture and Television Engineers (SMPTE) as a Vertical Interval Timecode (VITC) time code (for example). The SMPTE time code is measured in hours, minutes, seconds and frames per second. The video/audio and the VITC time code are transmitted via a satellite network to solution integrator 44 (for example).

It will now be appreciated that the two external clocks or GPS based timing systems may be locked to the same satellite reference source. These two clocks now become the source master time for the entire system 40. Two clocks locked to the same reference source are preferred over a single clock, because the physical geographical location of the video/audio transmission point and the geographical location of the meta-data server may be up to a mile apart within the same venue (Indy race in the example used above).

The solutions integrator 44 is configured to ingest the time stamped meta-data over IP into a process or origin type server system, namely, into the origin server 54 (for example). In addition, the solutions integrator 44 is configured to ingest the video, audio and VITC time code. The video is decoded and processed from an embedded signal. The solutions integrator then begins the MPEG 4 encoding process with the satellite integrated receiver/decoder (IRD) video, audio and VITC time code. The encoded video is then published to the content delivery network 47 (for example) via IP utilizing the HLS, smooth stream, or DASH encoding techniques with a time stamp wrapper.

Two time stamps now exist in system 40, one associated with the HLS video/audio (for example, the VITC time stamp header) and the other associated with the meta-data (for example, the .JSON time stamp). Latency issues may also exist, for example, due to ingesting and processing the video/audio and the meta-data. These issues may be taken into account by system 40, and in particular may be solved by the client application resident in mobile device 45 and the application server 53 resident in solution integrator 44. The latency issues are now explained below.

The mobile device 45, by way of a client application, is configured to request video and audio streaming data from the wireless content delivery network 47, using the cell tower 46 as an intermediary. The video and audio streaming data begins to flow to the mobile device 45 after the solution integrator 44 receives the video request from the user. The video and audio request may specify a particular video source or multiple video sources, for example, multiple imagers in the cars participating in the Indy car race. The video and audio streaming data includes a time stamped header for each video and audio channel streamed from the multiple sources in content provider 42.

The client application in mobile device 45 is configured to view the video and audio stream with the VITC time stamp header. At this point, the VITC time stamp is deemed to be the master time for synchronization, once the video stream locks in the VITC time code. The client application software in mobile device 45 is then configured to request the corresponding meta-data which has the same time code reference generated by the ERP generator server 49. The application server 53, which resides in the solution integrator 44, is configured to receive the request from the client application software and begin sending the meta-data with the corresponding .JSON time stamp via the ERP server 52 in the solution integrator 44. The .JSON time stamp is now slaved to the master time generated by the VITC time code. The meta-data with the .JSON time stamp is now also transmitted to the mobile device 45 by way of the content delivery network 47. The meta-data with the .JSON time stamp and the video/audio data with the VITC time stamp are both decoded inside the mobile device 45. The meta-data (the slave) is now synchronized to the video/audio data (the master). Both types of data are assembled in the mobile device 45 via the client application software that resides within the mobile device, for appropriate presentation on the device's display.

Figure 5:
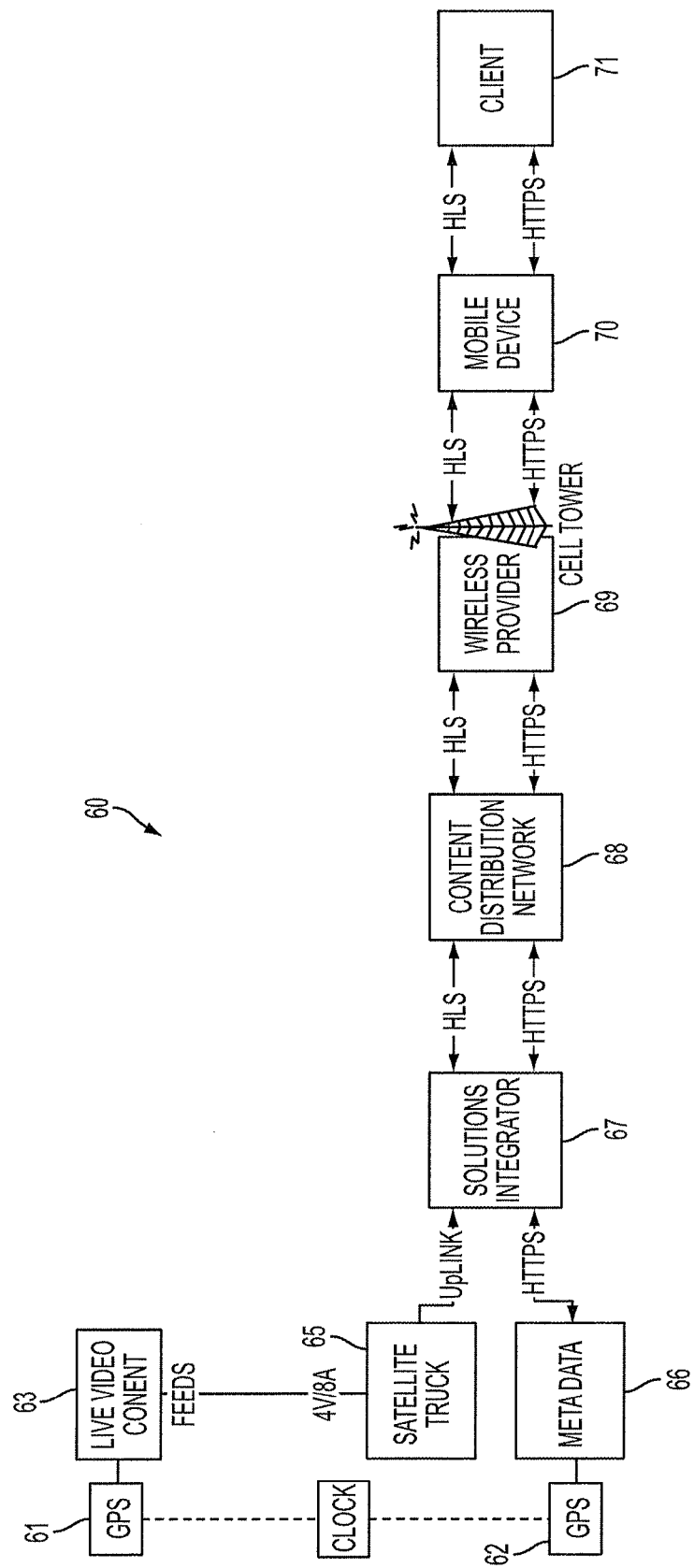
FIG. 5 is simplified functional block diagram of an example of a system of a network that provides live video and audio data of a live event to a user of a mobile device and also provides meta-data of the live event to the user in a synchronized manner for viewing and listening.

Referring to FIG. 5, another example is provided of a system, generally designated as 60, for providing synchronization of different types of data that are streamed from two different locations for use by a mobile device, such as the tablet shown in FIG. 1 as MS 13b, the latter operating in system 10. As shown in FIG. 5, a live 'video' content provider 63 feeds multiple live video/audio data stream, by way of a satellite truck 65. The provider 63 may be implemented by appropriate sources similar to those in FIG. 4. By way of example regarding FIG. 5, four video channels and eight audio channels are available for transmission by an RF uplink to a satellite from satellite truck 65. The video data from each channel is separately time stamped by an accurate clock, such as a GPS clock 61. In this example, source(s) of the content provider 63 apply the time stamp from GPS clock 61, e.g. in the form of a VITC time stamp. Although the audio/video data is shown delivered from a satellite truck 65 by an uplink (RF) it will be appreciated that the audio/video data may be delivered by another server providing HTTPS protocol communication.

Separately, meta-data is transmitted by the same content provider or another content provider, namely, meta-data provider 66. The meta-data provider may be any server, such as server 31, or server 33, or server 25 delivering data as shown in FIG. 1 in system 10. The meta-data is time stamped by another accurate clock, such as a GPS clock 62, e.g. as a .JSON time stamp.

A server (for example, a solutions integrator 67) receives the video/audio data as an RF downlink from the satellite truck 65 and separately receives the meta-data as an HTTPS formatted signal, e.g. via a terrestrial network providing IP packet data transport. The video/audio data are processed and published as HD video and audio signals, using MPEG coding, for example, to provide HLS formatted signals. The server also receives the meta-data and processes and publishes the meta-data as HTTPS formatted signals. Both types of signals contain accurate time stamps.

A wireless provider 69 is configured to receive the video/audio HLS formatted signals and the meta-data HTTPS formatted signals through a content distribution network 68, in which the latter is capable of communicating with the solutions integrator 67. As used herein, a content distribution network may be used to deliver an entire website, including dynamic, static and streaming content using one or multiple servers in many different locations. Depending on traffic and the number of nodes, the network's algorithms select the best delivery directions avoiding bottlenecks.

Figure 6:
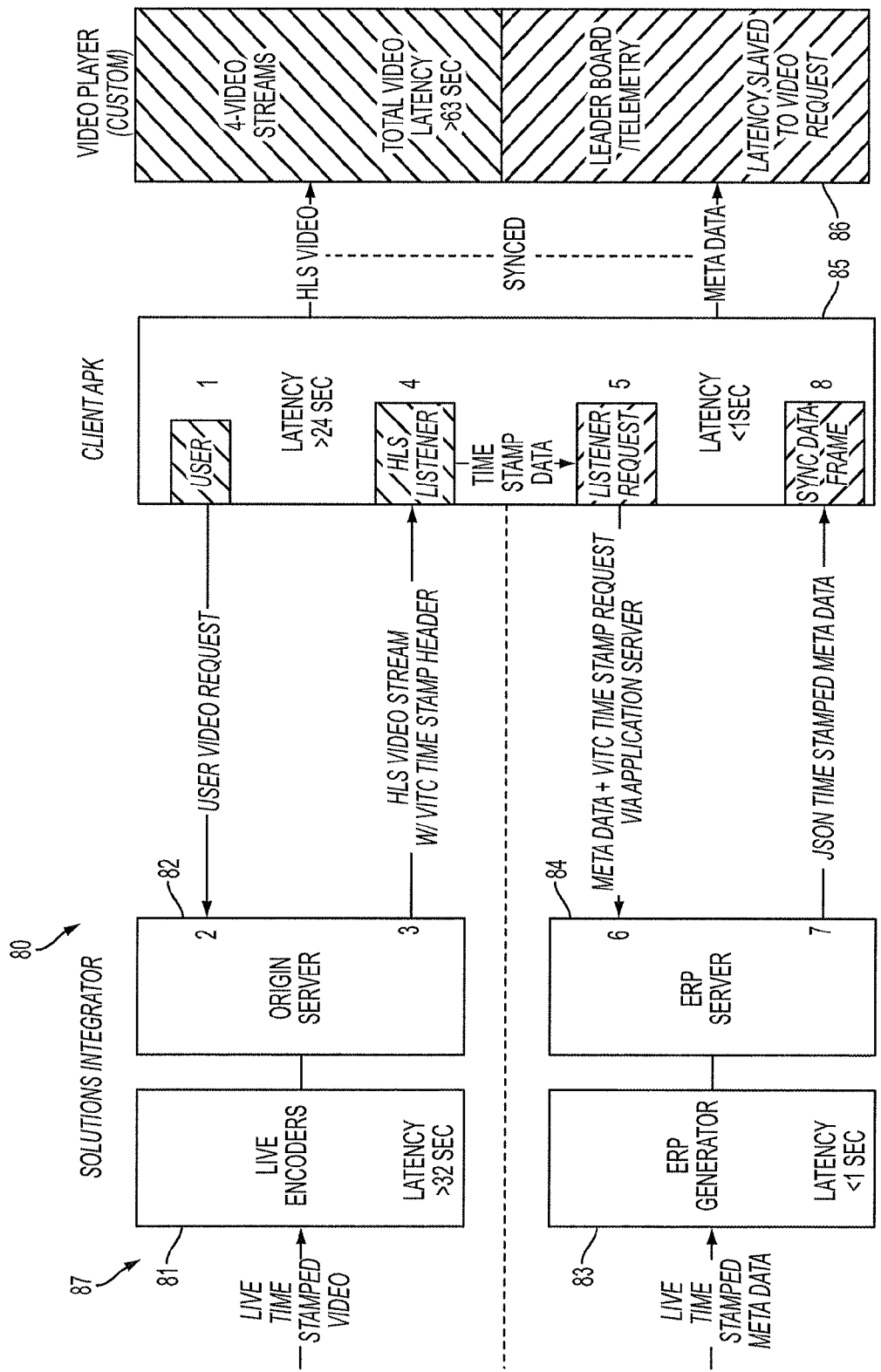
FIG. 6 is a functional block diagram of a client application disposed in a video player that communicates with multiple servers and allows the client to select time stamped video data and, in response, to receive meta-data that is synchronized to the selected time stamped video data.
Figure 7:
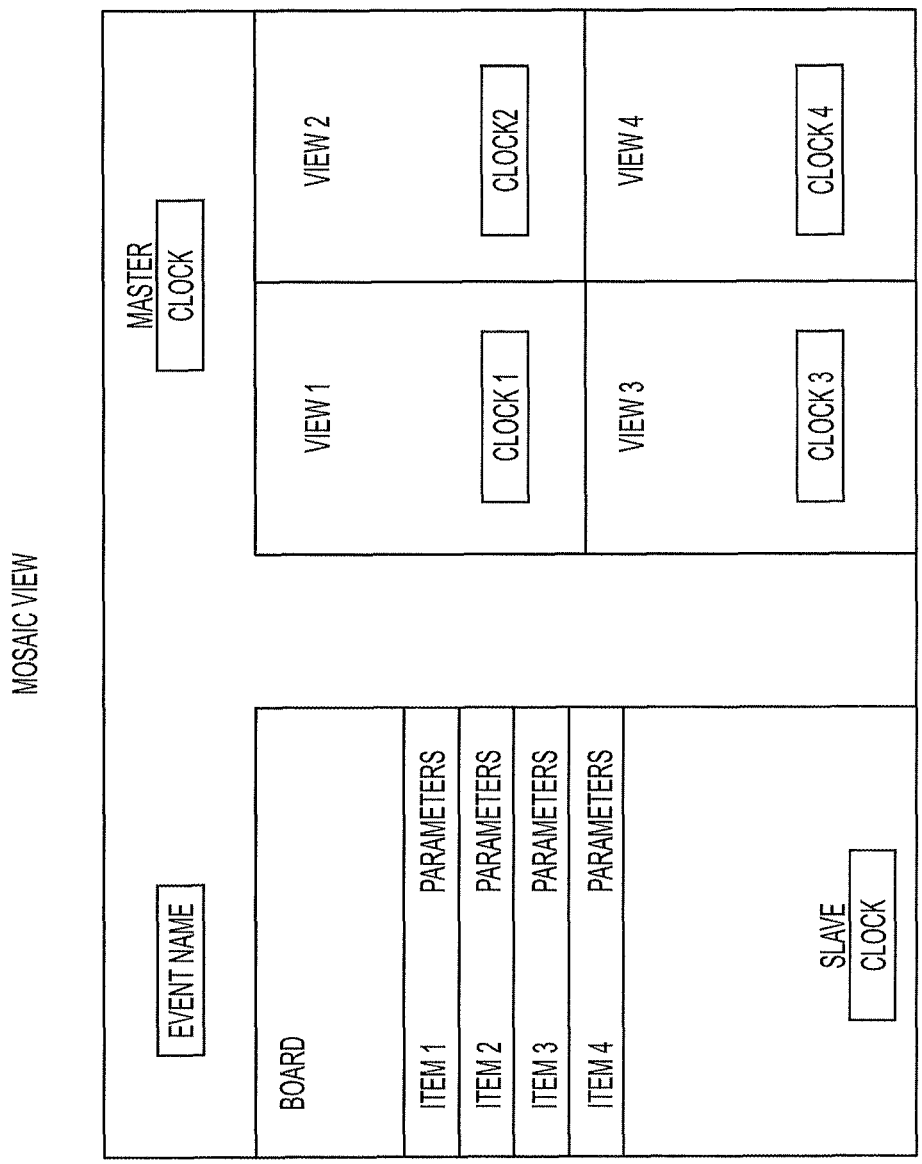
FIG. 7 is an example of a display on a video player showing a mosaic view of four different videos of a live event and meta-data of multiple parameters that are related to the four different videos of the live event.

Finally, the mobile device 70 (for example, a video player device, as shown in FIG. 7), which includes a client application program 71, communicates with the content distribution network 68 by way of the wireless provider 69. The client application program 71 is configured to display the video/audio HLS formatted signals on a display of mobile device 70. The time stamp associated with the video/audio HLS formatted signals are also displayed on the mobile device 70 (for example, the video player device). The user then requests, via the client application program, desired meta-data that corresponds to a time that is similar to the time stamp associated with the video/audio formatted signals. The request is communicated through the content distribution network 68 and to the solutions integrator 67 (a server). The solutions integrator is configured to transmit the requested meta-data to the user, based on the requested time stamp from the mobile device 70. More details of the flow of data between the mobile device and the multiple servers providing time stamped data (audio/video and meta-data) are provided next with reference to the flow of data shown in FIG. 6.

Thus, an example has been provided of a system that synchronizes two different types of data, for example, video/audio data and meta-data, within a mobile device for viewing by an end user. Each type of data includes an accurate time stamp. The latency associated with one type of data is different from the latency associated with the other type of data. These two types of data are conventionally not viewable together on a mobile device. The present example, however, combines the two types of data so that they display appropriately on a mobile device in correct time synchronization.

Using the client application 71, the user selects a desired time that is associated with one type of data, for example, a time stamp corresponding to a video being viewed on the mobile device. The client application 71 is configured to request meta-data that corresponds to the selected time. A remote server communicating with the mobile device is also configured to start streaming the meta-data corresponding to the requested time stamp. Thus, the time code associated with first type of data (for example, video data) becomes the master clock and the time code associated with the second type of data (for example, meta-data) becomes the slave clock. As the terms imply, the slave clock is slaved to the master clock. The user now, advantageously, may view two types of data that normally are not viewable together because of their disparate latencies.

Turning next to FIG. 6, there is shown a block diagram of a system 80 for synchronizing two different types of data that are streamed at different rates with different latencies within a system such as system 10, system 40, or system 60. By way of example only, system 80 depicts features that are similar to the features described with respect to system 40. As shown, system 80 includes a solutions integrator 87 (or more generally, a server capable of receiving two types of signals, namely, RF video/audio signals and HTTPS signals, processing both types of signals, and publishing both types of signals as HTTPS data). Also included in system 80 is a mobile device, for example, a video player tablet 86 and a client application program 85 that resides within the video player tablet.

The top portion of FIG. 6 includes encoders 81 coupled to an origin server 82; the bottom portion of FIG. 6 includes an ERP generator 83 and an ERP server 84. The components 81, 82 and 84 are part of the solutions integrator 87 (corresponding to the partitioning shown at 44 in FIG. 4). Again, the partitioning is intended for explanation purposes only. As shown, the encoders 81 receive live, time stamped video/audio data and convert the same into an MPEG stream with a VITC time stamp header. The coded data is sent to the origin server 82, which publishes the data as an HLS video stream with a VITC time stamp header. The ERP generator 83 extracts various parameters as live meta-data which is time stamped. The meta-data is sent to the ERP server 84 which processes the data and publishes the data in an HTTPS communications format.

In the example shown in FIG. 6, the origin server 82 publishes the HLS video stream with the VITC time stamp headers, whereas the ERP server 84 publishes the meta-data with the .JSON time stamps. It will be appreciated, however, that the time stamps may be other time stamps than the VITC time stamps, or the .JSON time stamps. These specific time stamps are provided as examples only.

The operation sequence between the client application 85 and the solutions integrator 87 will now be described by referring to the sequence of numbers (1 through 8) shown in FIG. 6:

1. The user, by way of the video player 86, initiates a video request of one or more channels of video/audio for viewing a live event on the device display.

2. The origin server 82 receives the request from the client application 85 of the device 86.

3. The origin server 82 begins streaming HLS video of the live event with the VITC time stamp header to the client application 85. Each video channel includes its own VITC time stamp.

4. The client application receives the HLS video with the time stamp information for viewing the desired channels on the video player 86.

5. Upon viewing the live video from one or more video sources (or channels) of the live event, the user initiates a request for meta-data that is associated with the VITC time stamp of a particular video channel on the display of the video player. The latency or transaction time of the meta-data between the client and the server is less than 2 seconds. The latency of the video between when the user requests a video and when the video is shown on the display is approximately 63 seconds. This is due to the down linking, encoding, publishing and decoding of the video. The ERP Server 84 buffers the delay with the meta-data time stamp. The video becomes the master clock of when the corresponding meta-data arrives at the application.

6. The ERP server 84 receives from the application server 53 the request for meta-data with the VITC time stamp.

7. In response to the request, the ERP server 84 transmits the meta-data with a corresponding .JSON time stamp of the live event.

8. The client application receives the meta-data having the corresponding time stamp and displays the meta-data on the video player. The meta-data is now related to the video being watched on the video player, as the meta-data is now synchronized to the video channel.

If meta-data goes missing (or is corrupted due to a connection or collection error) for a long period of time, the video continues to play. The leader board and telemetry data waits in place holding the last value until the next valid data is read. The application does not crash, but simply stands by for the next packet. In some embodiments, once the system determines that a predetermined period (for example, several seconds) has elapsed from receipt of the last valid data without receipt of new valid data, an indication is provided on the display that the data has not been recently refreshed, as well as perhaps the length of time from receipt of the last valid data.

Over time, the viewer views time stamped audio/video data and separately time stamped meta-data. Both types of data are now closely related in time. So long as the viewer makes no other audio/video selection from a specific source and makes no other meta-data selection from another specific source (or time stamp), both types of data continue to be streamed for display on the video player. When the viewer makes a change on the video player, the handshaking interchange or flow shown in FIG. 6 is repeated anew.

Referring now to FIG. 7, an example of a mosaic view on a video player is shown, which includes four views of four respective channels of live video of an event. For example, the event may be an Indy car race, and the four channels may include live videos of four of the drivers inside their respective vehicles. If desired, fewer than four views may be selected by the user, although more views/videos may be available. Each view includes its own clock on display.

The meta-data is shown displayed on the board section of the video player as items 1 through 4, in which each item includes several parameters. For example, items 1 through 4 may be the names of four race drivers in the event. The parameters may include text data of such items that are transmitted as telemetry data indicating status and performance associated with each car and driver. For a race example, these parameters may include tire pressure, car RPM, number of laps completed, etc. of each car. The meta-data includes a clock at the bottom of the board, and the video section includes a clock that is displayed at the top of the display. The clock of the video section is the clock whose time is selected by the viewer and, thus, is the master clock, whereas the clock displayed at the bottom of the board is the slave clock.

It will be appreciated that the two clocks will typically not be identical in time, but will likely be very close in time. The clocks (master and slave) continue to run unabated, based on the time stamped streamed audio/video data and the time stamped streamed meta-data. If the user selects view 2 (for example) the clock 2 becomes the master clock and the slave clock is slaved to clock 2. If the user selects clock 4 (for example), then clock 4 becomes the master clock and the slave clock is slaved to clock 4.

It will now be appreciated that due to the different types of data in the Indy car race (for example) which are available for viewing on the video player, each type of data has its own latency and update rate. For example, FIG. 6 shows that the live MPEG encoders may reach a latency that is greater than 32 seconds and the total latency in the video/audio data stream may be greater than 63 seconds. The meta-data, on the other hand, includes a latency that is less than a total of 2 seconds. Thus, in order to meaningfully be able to watch four cars speeding down a race course and, in addition, be able to associate performance and status parameters with each respective car, the meta-data must be synchronized to the video data. The examples provided herein described how such synchronization may be accomplished.

As shown by the above discussion, functions relating to the synchronization service may be implemented on computers connected for data communication via the components of a packet data network, operating as the various servers and/or client mobile stations, as shown in FIG. 1. Examples of client mobile stations have been discussed above, e.g. with reference to FIGS. 2 and 3. Although special purpose devices may be used, devices implementing server or network database functions or the like also may be implemented using one or more hardware platforms intended to represent a general class of data processing device commonly used to run "server" programming so as to implement the synchronization functions discussed above, albeit with an appropriate network connection for data communication. Most sports application systems in HLS encompass the meta-data as part of the video broadcast via a video graphic overlay inside the video. This synchronization technique can be used for any sporting event that has a unique video and meta-data source that do not follow the same path of transmission.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the synchronization service. The software code is executable by the general-purpose computer that functions as a server and/or that functions as a mobile device or other terminal device. In operation, the code is stored within the general-purpose computer platform. At other times, however, the software may be stored at other locations and/or transported for loading into the appropriate general-purpose computer system or mobile station. Execution of such code by a processor of the computer platform or mobile platform enables the platform to implement the methodology for synchronization, in essentially the manner performed in the implementations described and illustrated herein.

Figures 8, 9:
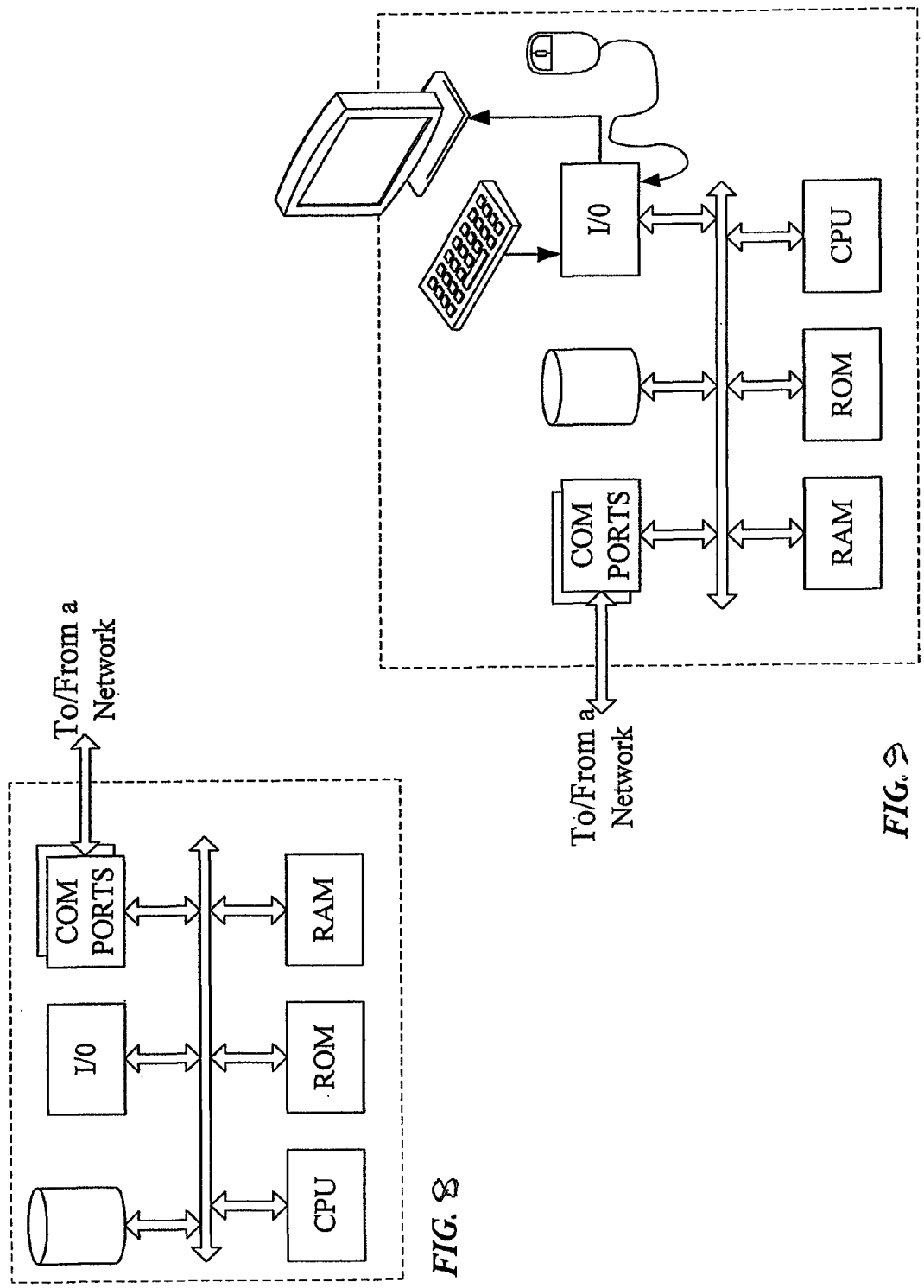
FIG. 8 is a simplified functional block diagram of a computer that may be configured as a host or server, for example, to function as a server in the system of FIG. 1.
FIG. 9 is a simplified functional block diagram of a personal computer or other work station, terminal device, or computer tablet.

FIGS. 8 and 9 provide functional block diagram illustrations of general purpose computer hardware platforms. FIG. 8 illustrates a network, or host computer platform, as may typically be used to implement a server, including network control 31 (FIG. 1). FIG. 9 depicts a computer with user interface elements, as may be used to implement a personal computer or other type of work station or terminal device, although the computer of FIG. 9 may also act as a server if appropriately programmed. It is believed that the general structure and general operation of such equipment, as shown in FIGS. 8 and 9, are self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the synchronization methods outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A synchronization method for a mobile station, the method comprising:
   requesting, by a processor in the mobile station, a first type of data from a mobile communication network, the first type of data obtained from a first source associated with a live event occurring remotely from the mobile station, and the first type of data having been published on the mobile communication network at a first time that is later than a live occurrence time of the live event;
   receiving, by the processor in the mobile station, the first type of data from the mobile communication network;
   configuring, by the processor, the first type of data for display by the mobile station, the first type of data having a first time stamp, wherein the first time stamp has a format defined by a first industry standard;
   requesting, by the processor, based on the first time stamp, the second type of data from the mobile communication network, wherein the second type of data:
      is obtained from a second source at the live event, the second source being different from the first source;
      has a time stamp having a second format different from the format of the first time stamp; and
      provides additional information related to the live event that changes during the occurrence of the live event; and
   receiving, by the processor, the second type of data, in which a second time stamp of the second type of data corresponds to the first time stamp of the first type of data;
   setting the first time stamp as a time of a master clock for display of the first type of data and second type of data; and
   configuring, by the processor, the second type of data for display with the first type of data; on the mobile station display in which the second time stamp of the second type of data corresponds to the master clock.

2. The method of claim 1 wherein:
   time stamping the first type of data includes combining timing data from a first clock with the first type of data, and
   time stamping the second type of data includes combining timing data from a second clock with the second type of data.

3. The method of claim 2 wherein the first clock and the second clock are derived from at least one Global Positioning System (GPS) timing system.

4. The method of claim 1 wherein:
the first type of data includes at least one video and audio data stream that is published in a Hypertext Transfer Protocol (HTTP) live streaming (HLS) communication format, and
the second type of data includes text data defined as meta-data that is published in an HTTP format.

5. The method of claim 4 wherein:
time stamping the first type of data includes inserting a vertical interval time code (VITC) time stamp header in the at least one video and audio data stream, and
time stamping the second type of data includes inserting a Java script object notation (JSON) time stamp in the meta-data.

6. The method of claim 5 wherein:
time stamping the first type of data is performed by a server communicating on the mobile communications network, and
time stamping the second type of data is performed by another server communicating on the mobile communications network.

7. The method of claim 1 wherein:
configuring the first type of data enables displaying at least one channel of video and audio data, in response to a first user selection, and
configuring the second type of data enables displaying meta-data related to the at least one channel of video and audio data, in response to a second user selection.

8. The method of claim 7 further including the steps of:
selecting a second time stamp for the meta-data, by the user, that is close in time to a first time stamp associated with the video and audio data;
requesting from the mobile communication network, by the processor, the meta-data with the second time stamp; and
receiving, by the processor, the meta-data with the second time stamp.

9. The method of claim 1 wherein:
receiving the first and second types of data from the mobile communication network includes loading a client application program in the mobile station for:
requesting the first type of data, and
requesting the second type of data, after requesting the first type of data.

10. The method of claim 9 wherein the client application program includes the steps of:
time synchronizing the second type of data to the first type of data; and
displaying the first and second types of data on the mobile station.

11. A client application for a mobile station, embodied in a non-transitory machine readable medium, in which the client application configures the mobile station to execute functions, including the functions to:
request, from a content distribution network, hypertext transfer protocol secure live streaming (HLS) video and audio of a live event obtained by a first source at the live event;
receive the requested HLS video and audio of the live event from the content distribution network, wherein the HLS video and audio have a first time stamp that has a format defined by a first industry standard;
present on the mobile station the HLS video and audio of the live event and a first time clock associated with the presented HLS video and audio;
send a subsequent request to the content distribution network requesting changing meta-data at a time during the live event similar to a time shown on the first time clock,
wherein the requested meta-data:
is obtained by a second source at the live event, the second source being different from the first source;
has a time stamp in accordance with a second format different from the format of the first time stamp;
provides additional information related to the live event that changes during the live event;
in response to the subsequent request, receive, from the content distribution network, the changing meta-data providing changing additional information related to the live event based on the first time stamp;
set the first time stamp as a time of a master clock for display of the first type of data and the second type of data; and
present, on the mobile station with the HLS video and audio of the live event and the first time clock, the meta-data, and a second time clock based on the second time stamp associated with the meta-data, the second time clock indicating time for the meta-data that is similar to the time shown on the presented first time clock.

12. The client application of claim 11 wherein:
receiving the HLS video and audio includes receiving a time stamp with the HLS video and audio; and
receiving the meta-data includes receiving another time stamp with the meta-data;
wherein each respective time stamp represents a respective time of occurrence of an event at the live event.

13. The client application of claim 12 wherein:
the time stamp in the HLS video and audio includes a VITC formatted time clock, and
the time stamp in the meta-data includes a JSON formatted time clock.

14. The client application of claim 11 wherein the first and second time clocks are obtained from at least one Global Positioning System (GPS) timing system.

15. The client application of claim 11 wherein the function to request the meta-data includes functions to:
transmit to the content distribution network, the time shown on the first time clock, and
receive from the content distribution network, the meta-data with the second time clock.

16. A mobile device comprising:
a wireless transceiver;
a display; and
a processor, wherein the processor is configured to:
request video data from a first source associated with a live event occurring remotely from the mobile station from a communication network via the wireless transceiver, the video having a first time stamp, and the video data having been published on the mobile communication network at a first time that is later than a live occurrence time of the live event, wherein the first time stamp has a format defined by a first industry standard;
receive the requested video data from the communication network via the wireless transceiver;
format the video data for output on the display of the mobile device, request meta-data, from the communication network via the wireless transceiver related to the displayed video, wherein the meta-data:
  is obtained from a second source at the live event, the second source being different from the first source;
  has a second time stamp having a second format different from the format of the first time stamp, and;
  provides additional information related to the live event that changes during the occurrence of the live event;
in response to the request for the metadata, receive the meta-data that is time synchronized to the video data based on a correspondence of the first time stamp with the second time stamp from the communication network via the wireless transceiver;
setting the first time stamp as a time of a master clock for display of the first type of data and second type of data; and
format the received meta-data for simultaneous presentation of the meta-data on the display of the mobile device with the video data according to the master clock.

17. The mobile device of claim 16 further including:
a memory coupled to the processor; and
a client application stored in the memory, wherein execution of the client application by the processor configures the mobile station to respond to a user selection of a time associated with the video data,
wherein the processor is further configured to request, from the communication network, the meta-data in response to the user selection of the time.

18. The mobile device of claim 17 further including:
a transmitter configured to transmit the request, to the communication network, of the time associated with the video data, and
a receiver configured to receive, from the communication network, the meta-data at a time similar to the time associated with the video data.

19. The mobile device of claim 16 wherein:
the video data includes a time stamp, and
the meta-data includes another time stamp.

20. The mobile device of claim 19 wherein:
the time stamp of the video data and the time stamp of the meta-data are derived from at least one GPS timing system.

* * * * *